United States Patent [19]

Llewellyn et al.

[11] Patent Number: 5,550,947
[45] Date of Patent: Aug. 27, 1996

[54] SLIDABLE OPTICAL FIBER INTERCONNECTING TRAY WITH FLEXIBLE FIBER GUIDING TUBES

[75] Inventors: Laurence Llewellyn, Chepstow; Mark G. Graveston; Ispran S. Kandasamy, both of Newport; Peter G. Hale, Merchant's Quay, all of United Kingdom

[73] Assignee: Pirelli General plc, London, England

[21] Appl. No.: 464,296

[22] Filed: Jun. 5, 1995

[30] Foreign Application Priority Data

Jun. 20, 1994 [GB] United Kingdom ............... 9412368

[51] Int. Cl.⁶ ....................................... G02B 6/36
[52] U.S. Cl. ............................... 385/134; 385/135
[58] Field of Search ........................... 385/134–137

[56] References Cited

U.S. PATENT DOCUMENTS

| | | | |
|---|---|---|---|
| 4,717,231 | 1/1988 | Dewez et al. | 385/135 |
| 4,765,710 | 8/1988 | Burmeister et al. | 385/134 |
| 4,776,662 | 10/1988 | Valleix | 385/137 |
| 4,792,203 | 12/1988 | Nelson et al. | 385/135 |
| 5,067,784 | 11/1991 | Debortoli et al. | 385/135 X |
| 5,071,211 | 12/1991 | Debortoli et al. | 385/135 X |
| 5,093,887 | 3/1992 | Witte | 385/135 |
| 5,138,688 | 8/1992 | Debortoli | 385/135 |
| 5,231,687 | 7/1993 | Handley | 385/135 X |
| 5,339,379 | 8/1994 | Kutsch et al. | 385/135 |
| 5,353,367 | 10/1994 | Czosnowski et al. | 385/135 |

FOREIGN PATENT DOCUMENTS

| | | | |
|---|---|---|---|
| 0211208 | 6/1986 | European Pat. Off. | G02B 6/44 |
| 0329935 | 8/1989 | European Pat. Off. | G02B 6/44 |
| 0356942 | 3/1990 | European Pat. Off. | G02B 6/44 |
| 0408266 | 1/1991 | European Pat. Off. | G02B 6/44 |
| 0466668 | 1/1992 | European Pat. Off. | G02B 6/44 |
| 0477574 | 4/1992 | European Pat. Off. | G02B 6/38 |
| 0341027 | 8/1993 | European Pat. Off. | G02B 6/44 |
| 2515466 | 4/1983 | France | G02B 7/26 |
| 2587127 | 3/1987 | France | G02B 6/38 |
| 4107598 | 9/1992 | Germany | G02B 6/00 |
| WO9105281 | 4/1991 | WIPO | G02B 6/44 |

*Primary Examiner*—John D. Lee
*Attorney, Agent, or Firm*—Brooks Haidt Haffner & Delahunty

[57] ABSTRACT

Apparatus for use in interconnecting optical fibers comprises a shelf 12 slidably mounted between a retracted position (FIG. 2) and an extended position. Housings 48 for locating fiber interconnections are mounted on the shelf 12. A plurality of tubes 22 are connected to respective further tubes 26, which are connected to the housings 48, by tube connector 30. The tubes 22 and 26 guide optical fibers to the housings 48. Each tube 22 has a substantially helical configuration over a portion 24 of its extent located behind the shelf 12 to accommodate sliding movement of the shelf.

21 Claims, 3 Drawing Sheets

5,550,947

SLIDABLE OPTICAL FIBER INTERCONNECTING TRAY WITH FLEXIBLE FIBER GUIDING TUBES

This invention relates to apparatus for use in interconnecting optical fibres, and more particularly to such an apparatus in which the interconnections are located on a support which is slidably moveable between a retracted position and an extended position, whereby the interconnections can be accessed.

Such an apparatus is disclosed in EP-A-0356942 and EP-A-0341027. A problem with the apparatus disclosed in the above-mentioned specifications is that the path of the optical fibres extending to and from the support is not positively controlled to have more than a minimum bend radius during said sliding movement.

An object of the present invention is to enable this problem to be overcome.

Accordingly, the present invention provides apparatus for use in interconnecting optical fibres, comprising a support, means for locating interconnections between the fibres on said support, support means for slidably supporting said support for movement between a retracted position and an extended position, and at least one flexible tube connectable to said support for guiding at least one optical fibre thereto, the or each tube having a substantially helical configuration over at least a portion of its extent locatable behind said support for accommodating said sliding movement of said support.

It will be understood that the helical configuration is able to stretch along its axis when the support is slid from its retracted position to its extended position and to contract along its axis when the support is slid from its extended position to its retracted position whilst maintaining bend radii greater than a predetermined minimum radius and without any accompanying stretching or contraction, or kinking or any other deformation, of the tube itself.

In the two embodiments of the invention described hereinafter, the apparatus comprises a plurality of said tubes, each being connectable to a respective further tube located on said support, said further tubes being connected to said interconnection locating means.

Furthermore, each of these embodiments comprise tube connector means on said support for connecting said tubes with said further tubes, said connector means providing a releasable connection for said tubes and/or said further tubes, whereby each tube is selectively connectable to any one of a plurality of further tubes. This is advantageous since it allows the selective routing of fibres in the tubes to the interconnection locating means.

The connector means may comprise at least one block providing a plurality of through-passages and means for connecting said tubes and further tubes to respective ends of said through passages.

The interconnection locating means may comprise at least one bank of housings on said support, each housing being adapted to locate at least one connection between two optical fibres.

Preferably, each housing in each bank is moveable out of alignment with the remainder of said housings thereof for providing access to the or each optical fibre connection located therein.

Advantageously, at least one further housing accommodating a passive optical device and provided with input/output connections for test purposes may be associated with each or at least one bank of housings.

The apparatus may comprise a connector array locatable on or to at least one of the two opposed sides of the apparatus which extend in the direction of said sliding movement for connecting said tubes to ducting means located to the or each side for ducting optical fibres to the apparatus.

Two of said connector arrays may be provided one on or to each of said sides, and in this case said tubes may be spaced apart behind said support between said sides, a first group of tubes being closer to one of said sides and a second group of tubes being closer to the other of said sides, wherein some of the said first group tubes and some of said second group tubes are connected to the connector array on or to said one side and the remainder of said first group tubes and the remainder of said second group tubes are connected to the connector array on or to said other side.

With the arrangement defined in the last preceding paragraph, when two banks of housings are located on said support, a first of which is closer to said one side than said other side and the second of which is closer to said other side than said one side, preferably said first group of tubes are connected to further tubes connected to said first bank and said second group of tubes are connected to further tubes connected to said second bank.

The apparatus may comprise means for slidably supporting said support means for movement between a retracted position and an extended position in the same direction as said sliding movement of said support. In this case, preferably the or each connector array is mounted on said support means and extends substantially in the direction of said sliding movement.

As an alternative, however, the or each connector means may be mounted to said support means, or a part to which said support means is fixed, and extend in a direction which is transverse the direction of said sliding movement.

The invention also includes apparatus for use in interconnecting optical fibres comprising a support means for locating interconnections between the fibres on the support, tube connector means on the support for connecting a plurality of tubes for guiding optical fibres to the support with respective further tubes connected to said interconnection locating means, said connector means providing a releasable connection for said tubes and/or said further tubes, whereby each tube is selectively connectable to any one of a plurality of further tubes.

In order that the invention may be well understood, two embodiments thereof, which are given by way of example only, will now be described with reference to the accompanying drawings, in which.

Figures 1, 2:
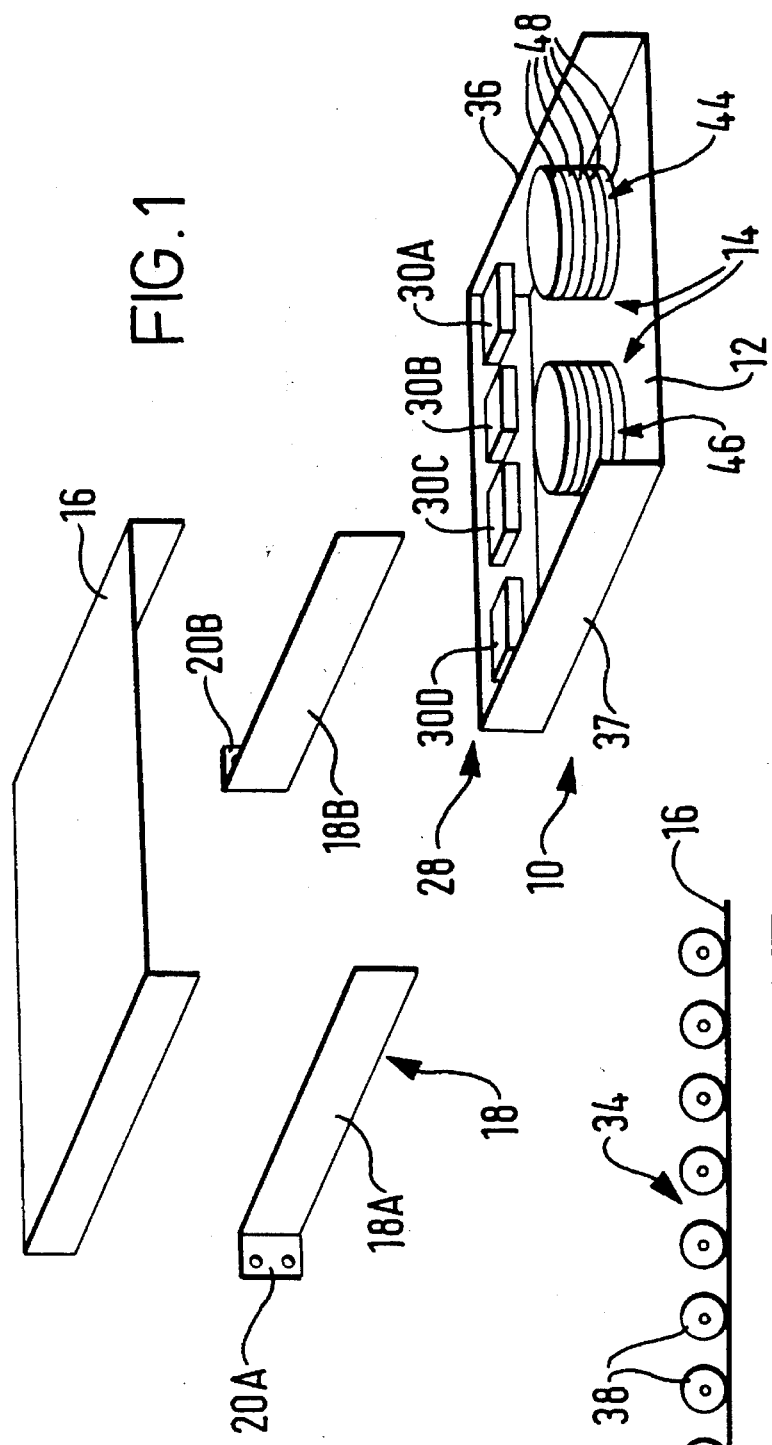
FIG. 1 is an exploded schematic view of an apparatus for interconnecting optical fibres with tubing of the apparatus omitted.
FIGS. 2 and 3 are respectively schematic side and top plan view of the apparatus of FIG. 1 in a contracted condition.
Figure 3:
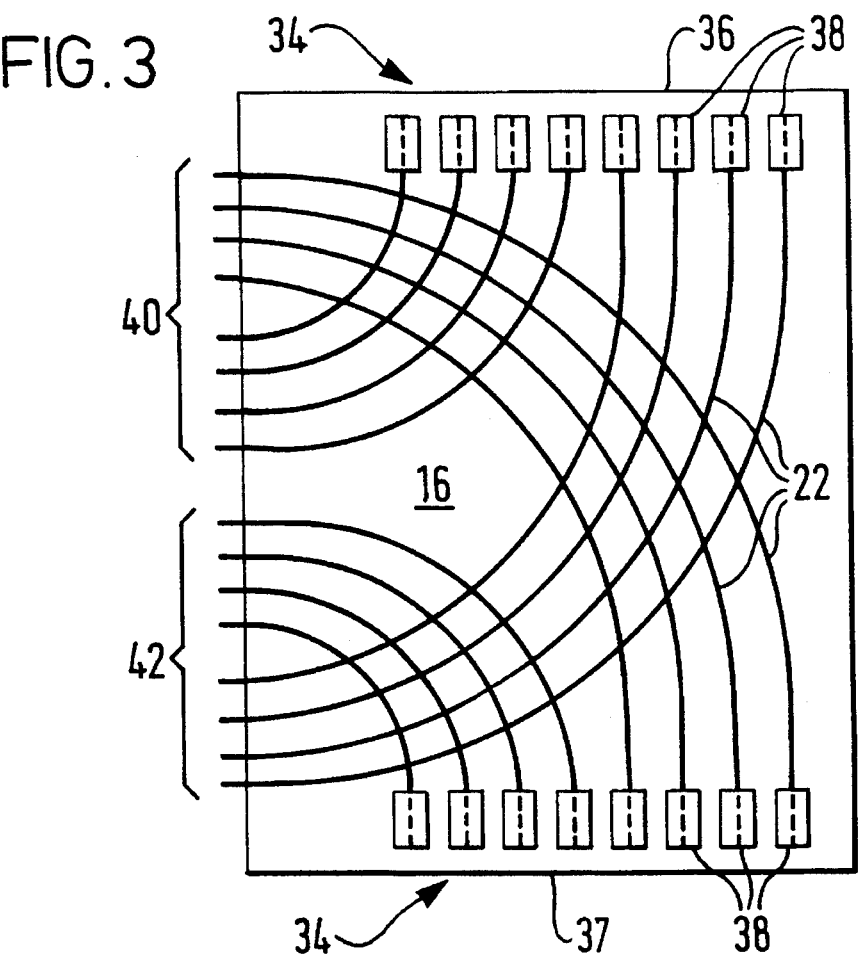

Referring first to FIGS. 1 to 4, the apparatus 10 illustrated therein comprises a support 12, hereinafter referred to as a shelf, which supports means, generally referenced 14, for locating interconnections between optical fibres. The shelf 12 is slidably supported by a support means 16, hereinafter referred to as an intermediate shelf, for movement between a retracted position (FIG. 2) and an extended position relative to the intermediate shelf 16.

The extended position provides access to the fibre interconnection locating means 14. The intermediate shelf 16 is itself slidably supported by a support means 18 which is mountable to a wall, rack or the like so as to extend substantially horizontally therefrom. As shown the support means comprises two brackets 18A and 18B which in use are mounted by means of respective flanges 20A and 20B a predetermined distance apart to slidably support the intermediate shelf 16 for movement between a retracted position and an extended position in the same direction as the direction of sliding movement of the shelf 12. The components 12, 16 and 18 are provided with conventional slideways (not shown) to provide said sliding movement between the shelf 12 and intermediate shelf 16 and between the intermediate shelf 16 and the brackets 18.

As will be appreciated when the apparatus is in a fully contracted condition with both the shelf and the intermediate shelf in their retracted positions, (i) the shelf 12 may be moved to its extended position, (ii) the intermediate shelf 16 may be moved to its extended position, and (iii) both the shelf and the intermediate shelf may be moved to their respective extended positions. In use, the apparatus is mounted in vertical banks with similar apparatus and with optical fibres interconnected in the apparatus running up or down one or more usually both sides of these banks. Thus, movement of the shelf 12 to its extended position relative to the intermediate shelf 16 provides access to components on the shelf 12 and movement of the intermediate shelf 16 to its extended position relative to the brackets 18 provides access to components on the intermediate shelf from the front of the apparatus. Of course, each shelf 12 in a vertical bank of apparatus may be moved independently of the other shelves.

Flexible tubes 22 are provided for guiding optical fibres from the sides of the apparatus to the shelf 12. As schematically illustrated in FIG. 2, each flexible tube 22 has a substantially helical configuration over at least a portion 24 of its extent which is located behind the shelf 12 for accommodating the sliding movement of the shelf between its retracted position (as illustrated in FIG. 2) and its extended position. As schematically illustrated the portion of helical configuration comprises a plurality of turns, but it is to be understood that this portion may comprise only one turn. Each flexible tube 22 is formed of a plastics or metal material and is preformed with its helically configured portion 24. The helically configured portion is able to stretch from its normal, unstressed condition which it adopts when the shelf 12 is in its retracted position, to accommodate movement of the shelf when the shelf is slid from its retracted position to its extended position, and to contract back to its normal position when the shelf 12 is slid back to its retracted position. During both such sliding movements the tube itself does not stretch or contract and the bend radii of the turns of the helical portion are arranged to be greater than the predetermined minimum bend radius of the optical fibre guided thereby. Furthermore, the wall thickness and/or configuration is such that there will be no damage to a fibre within the tube caused for example by kinking or other deformation during such movement.

Each flexible tube 22 is connected with a respective further tube 26 located on the shelf and connected to the fibre interconnection location means 14. Connection between a tube 22 and a further tube 26 is via a connector means 28 on the shelf 12 which provides a releasable connection for at least one of the tubes 22, 26 so that each tube 22 may be selectively connected to any one of a plurality of tubes 26. As illustrated, the connector means comprises a plurality of connector devices or blocks 30, each of which provides a plurality of through-passages and means for connecting the tubes 22 and further tubes 26 to respective ends of the through passages. FIG. 2 illustrates the connection of one tube 22 to one tube 26 via a block 30 and a through-passage 32 therein.

The ends of the tubes 22 remote from the connector blocks 30 are connected to connector arrays 34 located on the two opposed sides 36, 37 of the apparatus in the direction of sliding movement of its shelves 12 and 16. Each connector array 34 comprises a plurality of devices having through-passages 38 to the inner ends of which are connected respective tubes 22 and the outer ends of which are connectable to fibre ducting means (not shown), which may also comprise tubes, located to each side of the apparatus for ducting optical fibres to the apparatus. As will be appreciated from FIGS. 2 and 3, the tubes 22 are spaced apart behind the shelf 12 between the opposed sides 36, 37. A first group 40 of eight tubes is closer to the side 36 than the side 37 and a second group 42 of eight tubes is closer to the side 37 than the side 36. However, as seen from FIG. 3, some of the tubes from the group 40 and some of the tubes from the group 42 (shown as half in each case) are connected to the connector array on side 36 and the remainder of the tubes from the two groups are connected to the connector array on the side 37. The above arrangement facilitates interconnection of fibres from each side of the apparatus as the interconnecting means 14 comprises two banks 44, 46 of housings 48, bank 44 being closer to side 36 than side 37 and bank 46 being closer to side 37 than side 36. The first group 40 of tubes 22 are connected to further tubes 26 connected to the bank 44 and the second group 42 of tubes are connected to further tubes connected to the bank 46. Thus interconnections of fibres guided in the tubes of group 40 are made in bank 44 and interconnections of fibres guided in the tubes of group 42 are made in bank 46.

Figure 4:
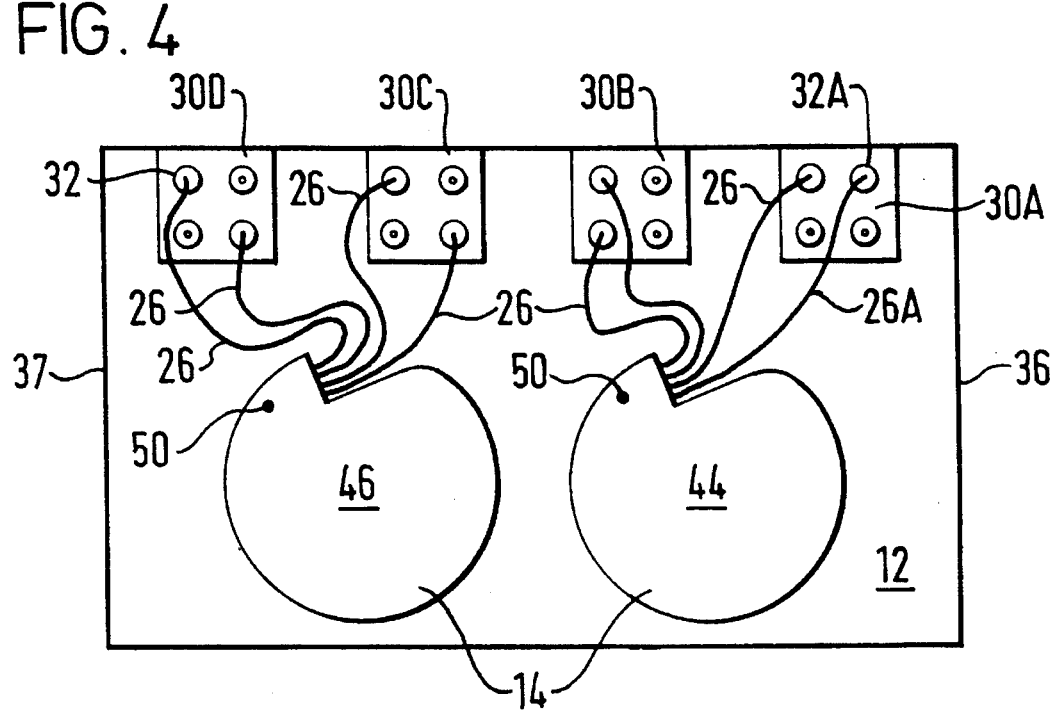
FIG. 4 is a schematic top plan view of part of the apparatus of FIG. 1.

As illustrated in FIG. 2, the tubes 22 are connected to the underside of connector blocks 30 and the tubes 26 to the uppersides thereof. Each bank 44, 46 has two associated connector blocks 30. In FIG. 4 these blocks are referenced 30A, B, C and D. Blocks 30A and B are connected to tubes 22 from group 40, block 30A being connected to tubes 22 in that group connected to the connector array on side 37 and block 30B being connected to the tubes 22 in the same group connected to the connection array on side 36. Blocks 30C and D on the other hand are connected to tubes 22 from group 42, block 30C being connected to the tubes 22 in that group connected to the connector array on side 37 and block 30D being connected to the connector array on side 36.

Thus, in FIG. 4, by way of example, bank 44 is shown arranged for connecting two optical fibres from side 37, which have been guided to block 30A, to two optical fibres from side 36, which have been guided to block 30B. As will be appreciated, although not illustrated in FIG. 4, each of the four through passages 32 in each block has a respective tube 22 connected to its lower end and each tube 26 may be connected to a selected one of the through-passages at its upper end to form a continuous passageway from one of the connector arrays to one of the banks.

Each housing 48 in each bank thereof is adapted to locate at least one connection between two optical fibres guided thereto. Each housing also includes storage space for housing excess fibre length and is provided with path defining means for locating the fibres within the housing along paths which do not have bends with radii less than the predetermined minimum bend radius of the optical fibres.

Each housing 48 in each bank 44, 46 is moveable out of alignment with the remainder of the housings in its bank in order to provide access to the or each optical fibre connection therein or the locations for such connections. In the illustrated embodiment each housing 48 is pivotably mounted with respect to the other housings in its bank about a respective vertical axis 50 indicated by reference 50 in FIG. 4.

The specific details of the configuration of the individual housings will not be described further herein as a detailed understanding thereof is not necessary for understanding the principles of the apparatus. However, the housings may be substantially the same as the housings for housing optical fibre connections disclosed in our co-pending UK Patent Application No. 9320101.0 to which attention is directed if further information is required.

Each bank 44, 46 may have associated with it at least one housing accommodating a passive optical device and provided with connections for test purposes. In practice each such further housing would be provided in the in place of a housing 48.

Figure 5:
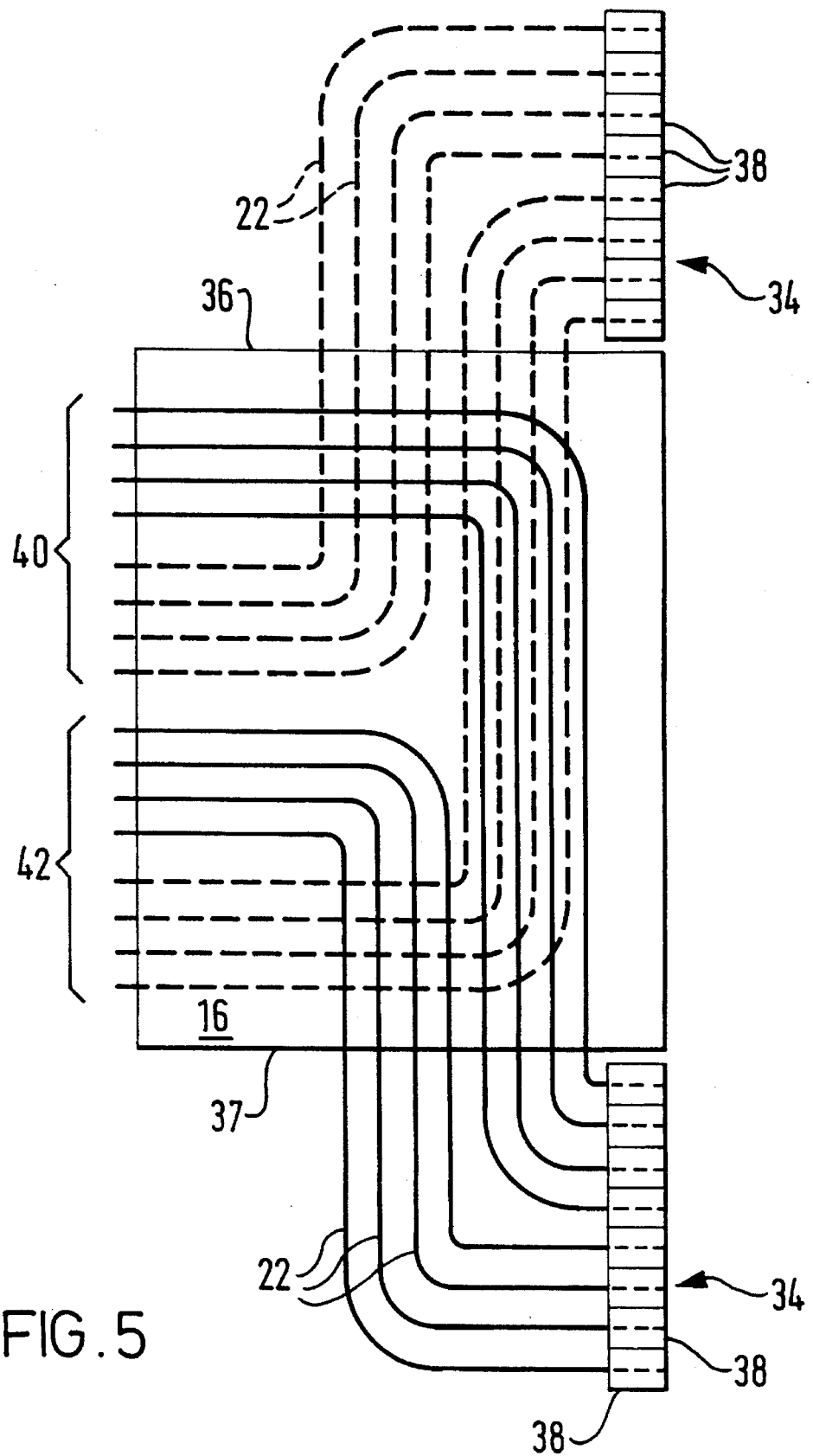
FIG. 5 is a schematic top plan view of an alternative apparatus.

Referring now to FIG. 5, a second embodiment, which is a modification of the first embodiment, will be described. Like reference numerals are used to indicate like parts in the embodiments. The second embodiment differs for the first embodiment in that the intermediate shelf 16, which slidably supports the shelf 12, is fixedly mounted to the wall, rack or the like, to which the support brackets 18 of the first embodiment are mounted, either directly or via mounting brackets. Since the intermediate shelf 16 itself is not slidably mounted, access to the connector arrays 34 would be limited if the connector arrays were mounted on the shelf extending in the direction of sliding movement as in the first embodiment. Accordingly, in the second embodiment each connector array 34 is mounted to the intermediate shelf 16 or a part, such as a rack part, to which the intermediate shelf 16 is fixed, to extend in a direction which is transverse the direction of sliding movement. As seen in FIG. 5, the connector arrays 34 are located to each side of the apparatus at the front thereof and are readily accessible.

The tubes 22 are arranged in two groups 40, 42 as in the first embodiment and for the sake of clarity the tubes 22 connected to the connector array 34 to side 36 of the apparatus have been illustrated by broken lines.

It will be appreciated from the above that each of the disclosed apparatus enables optical fibres to each side of the apparatus to be interconnected in a managed way using the tubes 22 and 26 to guide the fibres to desired housings 48 for interconnection therein. It will also be understood that the use of connector blocks 30 for making connections between the tubes 22 and 26 provides for flexibility in the routing of fibres within the apparatus.

Thus, although in FIG. 4 for example further tube 26A from one of the housings 48 in bank 44 is connected to through passage 32A and thus to the tube 22 from group 40 connected thereto, any of the other further tubes 26 connected to the other housings in bank 44, or if desired to the housings in bank 46, may be connected instead to through passage 32A.

Normally the apparatus will be used for interconnecting an optical fibre running on one side of the apparatus to an optical fibre running on the other side thereof. In such a case the shelf 12 is moved to its extended position to provide access to the banks 44, 46 of housings 48, and in the case of the first embodiment the intermediate shelf 16 is moved to its extended position to provide access to the connector arrays 34. A particular housing 48 is selected for locating the connection and pivoted out of alignment with the other housings in its bank. A respective tube 22 extending from each of the connector arrays 34 is connected to a further tube extending from that housing. The fibres are then fed through the respective tubes 22 and further tubes connected thereto into the housing 48. If the intermediate shelf 16 is slidable, it is then slid back to its retracted position.

The fibres are interconnected, typically by being fusion spliced together, and the interconnection and any excess fibre is located in the housing. The housing is pivoted back into alignment with the other housings in its bank and the shelf 12 slid back to its retracted position.

Whilst the above description refers to one fibre being fed through each tube 22 and the further tube 26 connected thereto, it is to be understood that this is by way of example only and typically a plurality of fibres are fed through each tube 22 and further tube 26 connected thereto. These may be single fibres provided with individual tight or loose jackets or fibres which are packaged together. The use of tubes 22 and further tubes 26 for guiding the optical fibres in the apparatus makes it particularly suited to the known blown fibre technique of installation, disclosed for example in EP-A-0108590. Using this technique an optical fibre assembly for blown installation comprising an optical fibre unit comprising at least one optical fibre is blown through a tube 22 and a further tube 26 connected thereto from the connector of the connector array 34 to which the tube 22 is connected directly into the housing 48 to which the further tube 26 is connected.

Whilst the above refers to the interconnection of fibres to each side of the apparatus being interconnected, it is to be understood that fibres from the same side may also be interconnected and that also the apparatus may be modified so that a connector array is provided on or to only one side of the apparatus.

We claim:

1. Apparatus for use in interconnecting optical fibres, comprising a support, means for locating interconnections between the fibres on said support, support means for slidably supporting said support for movement between a retracted position and an extended position, and at least one flexible tube connectable to said support for passing at least one optical fibre therethrough and guiding the fiber to said support, the or each tube having a substantially helical configuration over at least a portion of its extent locatable behind said support for accommodating said sliding movement of said support.

2. Apparatus as claimed in claim 1, comprising a plurality of said tubes, each being connectable to respective further tubes located on said support, said further tubes being connected to said interconnection locating means for passing the fibre therethrough and to said interconnection locating means.

3. Apparatus as claimed in claim 2, comprising tube connector means on said support for connecting said plurality of tubes with said further tubes, said connector means providing a releasable connection for said tubes and/or said further tubes, whereby each tube is selectively connectable to any one of a plurality of further tubes.

4. Apparatus as claimed in claim 3, wherein said connector means comprises at least one block providing a plurality of through-passages for passing optical fibres therethrough and means for connecting said plurality of tubes and further tubes to respective ends of said through passages.

5. Apparatus as claimed in claim 2, wherein said interconnection locating means comprises at least one bank of housings on said support, each housing being adapted to locate at least one connection between two optical fibres.

6. Apparatus as claimed in claim 5, wherein each housing in said bank is moveable out of alignment with the remainder of said housings thereof for providing access to the or each optical fibre connection located therein.

7. Apparatus as claimed in claim 5, wherein associated with the or at least one of said bank of housings is at least one further housing accommodating a passive optical device and provided with input/output connections for test purposes.

8. Apparatus as claimed in claim 2, comprising a connector array locatable on or to at least one of the two opposed sides of the apparatus which extend in the direction of said sliding movement for connecting said tubes to ducting means located to the or each side for ducting optical fibres to the apparatus.

9. Apparatus as claimed in claim 8, comprising two of said connector arrays, one on or to each of said sides, and wherein said tubes are spaced apart behind said support between said sides, a first group of tubes being closer to one of said sides and a second group of tubes being closer to the other of said sides, wherein some of the said first group of tubes and some of said second group of tubes are connected to the connector array on or to said one side and the remainder of said first group of tubes and the remainder of said second group of tubes are connected to the connector array on or to said other side.

10. Apparatus as claimed in claim 9, wherein said interconnection locating means comprises two banks of housings located on said support, each housing being adapted to locate at least one connection between two optical fibres, a first of said banks being closer to said one side than said other side and the second of said banks being closer to said other side than said one side, and wherein said first group of tubes are connected to further tubes connected to said first bank and said second group of tubes are connected to further tubes connected to said second bank.

11. Apparatus as claimed in claim 8, wherein the or each connector array is mounted to said support means, or a part to which said support means is fixed, and extends in a direction which is transverse to the direction of said sliding movement.

12. Apparatus as claimed in claim 2 wherein each of said plurality of tubes when connected to a further tube provides a continuous passageway extending through each of said plurality of tubes and the further tube to which it is connected and to said interconnection locating means and which permits at least one optical fibre to be inserted into an end of each of said plurality of tubes and fed to said interconnection locating means without interruption.

13. Apparatus as claimed in claim 1, comprising means for slidably supporting said support means for movement between a retracted position and an extended position in the same direction as said sliding movement of said support.

14. Apparatus as claimed in claim 13, comprising a connector array locatable on or to at least one of the two opposed sides of the apparatus which extend in the direction of said sliding movement for connecting said tubes to ducting means located to the or each side for ducting optical fibres to the apparatus, and wherein the or each connector array is mounted on said support means and extends substantially in the direction of said sliding movement.

15. Apparatus as claimed in claim 1 wherein the radius of the helix of the helical configuration is greater than the minimum bending radius of said optical fibre.

16. Apparatus for use in interconnecting optical fibres comprising a support, means for locating interconnections between the fibres on the support, tube connector means on the support for connecting a plurality of tubes for the passage therethrough and guiding of optical fibres to the support with respective further tubes connected to said interconnection locating means for the passage therethrough and guidance of said optical fibres to said interconnection locating means, said connector means providing a releasable connection for said tubes and/or said further tubes, whereby each tube is selectively connectable to any one of a plurality of said further tubes to form respective continuous passages for optical fibres to said interconnection locating means through said tubes, said tube connector means and said further tubes.

17. Apparatus as claimed in claim 16, wherein said connector means comprises at least one block providing a plurality of through-passages for passing of optical fibres therethrough and means for connecting said tubes and further tubes to respective ends of said through passages.

18. Apparatus as claimed in claim 16, wherein said interconnection locating means comprises at least one bank of housings on said support, each housing being adapted to locate at least one connection between two optical fibres.

19. Apparatus as claimed in claim 18, wherein each housing in said bank is movable out of alignment with the remainder of said housings thereof for providing access to the or each optical fibre connection located therein.

20. Apparatus as claimed in claim 18, wherein associated with the or at least one of said bank of housings is at least one further housing accommodating a passive optical device and provided with input/output connections for test purposes.

21. Apparatus for use in interconnecting optical fibres, comprising a support, means for locating interconnections between the fibres on said support, support means for slidably supporting said support for sliding movement in a first direction between a retracted position and an extended position, and a plurality of flexible first tubes connectable to said support for passing optical fibres therethrough and guiding optical fibres to said support, each tube having a substantially helical configuration over at least a portion of its extent disposed in a second opposite direction with respect to said support for accommodating said sliding movement of said support, and a plurality of second tubes for passing optical fibres therethrough connected to said interconnection locating means, each said first tube being connectable to a respective second tube to form a passage for passing at least one optical fibre to said support and to said interconnection locating means.

* * * * *